(12) United States Patent
Granato Villas Boas et al.

(10) Patent No.: US 12,207,661 B2
(45) Date of Patent: Jan. 28, 2025

(54) PROCESS AND COMPOSITION FOR AN IMPROVED FLOUR PRODUCT

(71) Applicant: Green Spot Technologies SAS, Toulouse (FR)

(72) Inventors: Silas Granato Villas Boas, Auckland (NZ); Ninna Granucci, Auckland (NZ)

(73) Assignee: GREEN SPOT TECHNOLOGIES SAS, Toulouse (FR)

( * ) Notice: Subject to any disclaimer, the term of this patent is extended or adjusted under 35 U.S.C. 154(b) by 0 days.

(21) Appl. No.: 15/826,496

(22) Filed: Nov. 29, 2017

(65) Prior Publication Data
US 2018/0146688 A1 May 31, 2018

Related U.S. Application Data

(60) Provisional application No. 62/428,411, filed on Nov. 30, 2016.

(51) Int. Cl.
| A21D 2/36 | (2006.01) |
| A21D 8/04 | (2006.01) |
| A21D 13/04 | (2017.01) |
| A21D 13/047 | (2017.01) |
| A21D 13/066 | (2017.01) |

(Continued)

(52) U.S. Cl.
CPC ............ *A21D 13/066* (2013.01); *A21D 2/36* (2013.01); *A21D 2/362* (2013.01); *A21D 2/364* (2013.01); *A21D 2/366* (2013.01); *A21D 8/04* (2013.01); *A21D 13/04* (2013.01); *A21D 13/047* (2017.01); *A21D 13/80* (2017.01); *A23L 7/104* (2016.08); *A23L 7/109* (2016.08); *A23L 7/126* (2016.08);
(Continued)

(58) Field of Classification Search
CPC ...... A21D 13/066; A21D 13/047; A21D 8/04; A21D 13/04; A23D 13/80; A23L 7/104; A23L 7/126; A23L 19/01; A23L 23/00; A23L 7/109
See application file for complete search history.

(56) References Cited

U.S. PATENT DOCUMENTS

| 6,346,216 B1 * | 2/2002 | Kent ............... A61L 2/0035 422/22 |
| 9,441,257 B2 | 9/2016 | Choi et al. |

(Continued)

FOREIGN PATENT DOCUMENTS

| BR | PI0603003 A | 3/2008 |
| CL | 50516 | 12/2014 |

(Continued)

OTHER PUBLICATIONS

Quinn, "Fungal fermentation of peanut flour: effects on chemical composition and nutritive value", Journal of Food Science, 1975, vol. 40, pp. 470-474.*

(Continued)

*Primary Examiner* — Changqing Li
(74) *Attorney, Agent, or Firm* — ArentFox Schiff LLP

(57) ABSTRACT

The invention describes a food or flour composition derived from fungal fermentation of plant material, the flour composition having a total metabolizable carbohydrate level of between 0.1-50% by weight. Also described are processes for the manufacture of the food or flour compositions using fungal fermentation having a total metabolizable carbohydrate level of between 0.1-50% by weight.

16 Claims, 2 Drawing Sheets

(51) Int. Cl.
    *A21D 13/80* (2017.01)
    *A23L 7/104* (2016.01)
    *A23L 7/109* (2016.01)
    *A23L 7/126* (2016.01)
    *A23L 19/00* (2016.01)
    *A23L 23/00* (2016.01)

(52) U.S. Cl.
    CPC .............. *A23L 19/01* (2016.08); *A23L 23/00* (2016.08); *A23V 2002/00* (2013.01)

(56) References Cited

U.S. PATENT DOCUMENTS

| | | | |
|---|---|---|---|
| 2006/0233864 A1 | 10/2006 | Power | |
| 2006/0280753 A1 | 12/2006 | McNeary | |
| 2010/0310716 A1 | 12/2010 | Cho et al. | |
| 2010/0316763 A1 | 12/2010 | Choi et al. | |
| 2013/0224333 A1 | 8/2013 | Nanjundaswamy et al. | |
| 2015/0044356 A1 | 2/2015 | Bootsma et al. | |
| 2016/0304924 A1 | 10/2016 | Fortin et al. | |
| 2017/0150730 A1 | 6/2017 | Charrak et al. | |

FOREIGN PATENT DOCUMENTS

| | | | | |
|---|---|---|---|---|
| CN | 1663421 | A | * | 9/2005 |
| CN | 104738128 | A | | 7/2015 |
| CN | 104822822 | A | | 8/2015 |
| CN | 106136127 | A | | 11/2016 |
| EP | 0357320 | A2 | | 3/1990 |
| JP | H0265748 | A | | 3/1990 |
| JP | 2016174588 | A | | 10/2016 |
| JP | 3207248 | U | | 11/2016 |
| KR | 1020100049513 | A | | 5/2010 |
| WO | 2006097949 | A1 | | 9/2006 |
| WO | WO-2011032244 | A1 | * | 3/2011 ............. A21D 13/02 |
| WO | 2011149956 | A2 | | 12/2011 |
| WO | 2012076911 | A2 | | 6/2012 |
| WO | 2012078256 | A1 | | 6/2012 |
| WO | 2014185805 | A1 | | 11/2014 |
| WO | 2015197760 | A1 | | 12/2015 |

OTHER PUBLICATIONS

Villas, "Bioconversion of apple pomace into a nutritionally enriched substrate by Candida utilis and Pleurotus ostreatus", World Journal of Microbiology and Biotechnology, 2003, vol. 19, pp. 461-467.*

Joshi, "Preparation and evaluation of an animal feed byproduct produced by solid-state fermentation of apple pomace", Bioresource Technology, 1996, vol. 56, pp. 251-255 (hereinafter referred to as Joshi).*

Zilly, "Solid-State Bioconversion of Passion Fruit Waste by White-Rot Fungi for Production of Oxidative and Hydrolytic Enzymes", Food and Bioprocess Technology, 2012, 5(5), pp. 1573-1580.*

Rodriguez, "Influence of airflow intensity on phytase production by solid-state fermentation", Bioresource Technology, 2012, 118, pp. 603-606.*

Borzani, "A Simple Method to Control the Moisture Content of the Fermenting Medium during Laboratory-Scale Solid-State Fermentation Experiments", Brazilian Journal of Chemical Engineering, 1999, 16, pp. 101-102.*

Parikh, "Vacuum Drying: Basics and Application", Chemical Engineering, Apr. 2015, pp. 48-54.*

Omwango, "Nutrient enrichment of pineapple waste using Aspergillus niger and Trichoderma viride by solid state fermentation", African Journal of Biotechnology, 2013, 12(43), pp. 6193-6196 (Year: 2013).*

Mokochinski, "Biomass and Sterol Production from Vegetal Substrate Fermentation Using Agaricus brasiliensis", Journal of Food Quality, 2015, vol. 38, pp. 221-229 (Year: 2015).*

Liu, "History and development of Solid State Fermentation", in: Chen, Solid State Fermentation for Foods and Beverage (CRC Press, 2013), pp. 1-7 (Year: 2013).*

Liu, "History and development of Solid State Fermentation" and "History of Solid State Fermented Foods and Beverages", in: Chen, Solid State Fermentation for Foods and Beverage (CRC Press, 2013), pp. 1-25 and 95-115 (Year: 2013).*

Silva, "Biotransformation of Pequi and Guavira Fruit Wastes via Solid State Bioprocess Using Pleurotus Sajor-Caju", International Journal of Bioscience, Biochemistry and Bioinformatics, vol. 3, No. 2, Mar. 2013 (Year: 2013).*

Joshi, VK and Devender Attri, "Solid State Fermentation of Apple Pomace for the Production of Value Added Products", Natural Product Radiance, Jul.-Aug. 2006, p. 289-296, vol. 5(4), http://nopr.niscair.res.in/handle/123456789/7966.

Zhong-Tao, Sun, Tian Lin-Mao, Lui Cheng, and Du Jin-Hua, "Bioconversion of Apple Pomace into a Multienzyme Bio-Feed by Two Mixed Strains of Aspergillus Niger in Solid State Fermentation", Electronic Journal of Biotechnology, Jan. 15, 2009, vol. 12, No. 1, http://www.ejbiotechnology.info/index.php/ejbiotechnology/article/view/v12n1-1/677.

S. Acun and H. Gul, "Effects of grape pomace and grape seed flours on cookie quality", Quality Assurance and Safety of Crops & Foods, Mar. 2014, 6 (1), pp. 81-88.

Yitzhak Hadar, "Biodegradation of lignocellulosic agricultural wastes by Pleurotus ostreatus", Journal of Biotechnology, 1993, 133-139.

VK Johsi, "Ethnaol recovery from solid state fermented apple pomace and evaluation of physico-chemical characteristics of the residue", Natural Product Radiance, Search Paper, vol. 7 (2), 127-132.

Guadalupe Ortiz-Tovar, "Effect of Solid Substrate Fermentation on th Nutritional Quality of Agro-Industrial Residues", Interciencia, May 2007, vol. 32, No. 5, 339-343.

W. Prinyawiwatkul, "Functional Property Changes in Partially Defatted Peanut Flour Caused by Fungal Fermentation and Heat Treatment", Journal of Food and Science, 1993, vol. 58, No. 6, 1318-1323.

F. Zadrazil, "Treatment of Lignocellulosics with White Rot Fungi", Commission of the European Communities, 1988.

Gui-Ping Zhang, "Soild-state fermentation of cornmeal with the ascomycete Morchella esculenta for degrading starch and upgrading nutritional value", World J. Microbiol Biotechnol, 2010, vol. 26, 15-20.

David D. Perkins, "How to Choose and Prepare Media", Apr. 18, 2006.

"How to Culture Mushroom," Standard Technology Book, DeepL, 2006, 15 pages.

* cited by examiner

PROCESS AND COMPOSITION FOR AN IMPROVED FLOUR PRODUCT

RELATED APPLICATIONS

This application claims priority to U.S. Provisional Patent Application No. 62/428,411, entitled "A PROCESS AND COMPOSITION FOR AN IMPROVED FLOUR PRODUCT", filed Nov. 30, 2016, which is incorporated herein for all it discloses.

BACKGROUND OF THE INVENTION

Field of the Invention

This invention relates to an improved food product and a process for making the improved food product. More specifically, the improved food product is a low-calorie flour product produced by the fermentation of plant material by higher fungi.

Background and Related Art

The majority of flour used in the food industry and in traditional cooking and baking methods is derived from a range of different plant materials, particularly cereals, which have been ground into a fine powder.

Flour is traditionally made by grinding the plant material, such as wheat. Different parts of the wheat grain are used to make different types of flour. Some fruit and vegetable flours are known but these are formed by simply drying the fruit or vegetable and then grinding or milling the dried fruit or vegetable into flour. For example apple, blueberry, grape or plum fibre made by Marshall Ingredients (www.marshallingredients.com). Due to the high content of simple sugars and/or starch of many fruits and vegetables, such flours consequently remain high in metabolizable carbohydrates.

The nutritional components of traditional flours are dependent on the type of plant material used and to the extent it is milled and blended with other plant material. Generally speaking, a high protein cereal grain will result in a high protein flour, and increasing the metabolizable carbohydrate level in a raw material results in a final milled product with a similar metabolizable carbohydrate level.

Typical calorific levels for commonly used flours range from around 330-360 calories/100 g for wheat, corn and rice flours, with nut based flours (for example, almond) reaching up to 550-600 calories per 100 g. For consumers who are reducing their calorie intake for health or personal reasons, the relatively high calorie content of traditional flours makes them less desirable than other lower calorie food.

US200690280753 ('753) describes a "mycoflour" product produced from the fermentation of oats, the flour irradiated with UV light to increase the nutritional value of the flour, in particular vitamin D levels. The flours described within '753 however are high in metabolizable carbohydrate and are designed to provide an odourless, tasteless, calorie rich product that can be used as a food product.

US20100316763 ('763) describes a fermented food product made from edible plants or animals that can inhibit food deterioration and growth of pathogenic microbes in the food products. The food compositions include the addition of a saccharide and discloses the advantages of increasing carbohydrate, rather than providing any method or suggestion of the production of a low calorie food product.

US2006233864 discloses methods for improving the nutritional quality of fibrous by-products using fermentation, particularly to produce high protein feed for animals that will result in body weight gains by developing a feed having optimum levels of protein, fibre and fat for livestock.

It would be advantageous to develop a reduced calorie flour product for human consumption that could be incorporated into baked, processed or raw foods that retained the physical advantages of flour, without the high calorie content.

It would be a further advantage to produce flour composition low in metabolizable carbohydrate that provides an appealing range of tastes, textures and colours that can be utilized to achieve palatable food products.

It would be a further advantage to develop a process for the production of a low calorie flour that enabled the use of a wider range of plant materials than are commonly used to produce traditional flours.

It would be a further advantage to develop a useful food product from waste or by-products of fruit, vegetable or grain processing.

It is an object of the invention to provide a flour composition having less metabolizable carbohydrate when compared to other flours.

Alternatively, it is an object of the invention to provide a flour composition having a lower calorific value when compared to other flours.

Alternatively, it is an object to provide a process for the production of a flour composition having less metabolizable carbohydrate when compared to other flours.

Alternatively, it is an object to provide a process for the production of a flour composition having a lower calorific content when compared to other flours.

Alternatively, it is an object of the invention to provide a food composition derived from fungal fermentation of plant material, the food composition having a total metabolizable carbohydrate level less than the total metabolizable carbohydrate level of the plant material prior to fermentation.

Alternatively, it is an object of the invention to at least provide the public with a useful choice.

SUMMARY OF THE INVENTION

According to a first aspect of the invention, there is provided a flour composition derived from fungal fermentation of plant material, the flour position having a total metabolizable carbohydrate level of between 0.1-50% by weight.

In preferred embodiments of the invention, the flour composition comprises 0.1-30% by weight metabolizable carbohydrate. More preferably, the flour composition comprises 0.1-15% by weight metabolizable carbohydrate, even more preferably, less than 10% by weight available carbohydrate.

In further preferred embodiments of the invention the flour composition comprises between 30-90% by weight dietary fibre (non-metabolizable carbohydrate). In the more preferred embodiments, the flour comprises 40-80% by weight dietary fibre.

In more preferred embodiments, the dietary fibre includes 5%-70% beta glucans, even more preferably, fungal derived 1, 3 and 1,6 beta glucans. More preferably, the dietary fibre includes 40%-65% fungal derived 1, 3 and 1,6 beta glucans.

In further preferred embodiments the flour composition has 150-300 calories/100 g flour.

More preferably, the flour composition includes 150-250 calories/100 g flour.

In preferred embodiments the flour composition has less than 300 calories per 100 g, flour.

In preferred embodiments, the flour composition includes 0.1-15% metabolizable carbohydrate, 15-35% protein, 1-10% fat and 50-80% dietary fibre.

More preferably, the dietary fibre includes 40%-65% fungal derived 1, 3 and 1,6 beta glucans.

In preferred embodiments of the invention the flour composition has a linoleic acid content of 10% of the total fat or greater.

More preferably, the flour composition has a linoleic acid content of 20-70% of the total fat.

In further preferred embodiments of the invention the plant material is selected from one or more fruits, nuts, cereals or vegetables including but not limited to kiwifruit, apple, pear, orange, carrot, mango, tomato, avocado, bellies, bean, pea, lime, lemon, feijoa, cassava, onion, parsnip, beetroot, banana, peach, nectarine, paw, pineapple, melon, mesquite, watermelon, acorn, hazelnut, chestnut, chickpea, chia, grape, potato, coconut, almond, soybean, sorghum, arrowroot, amaranth, taro, oats, cattails, quinoa, wheat, barley, buckwheat, corn, rice, atta, spelt, rye, hemp, teff or by-products and/or derivatives thereof such as fruit and vegetable pomaces, skins/peels, seeds or roots.

In some embodiments of the invention the flour composition is gluten-free and the plant material is selected from one or more gluten free plant materials including, but not limited to kiwifruit, apple, pear, orange, carrot, mango, tomato, avocado, berries, bean, pea, lime, lemon, feijoa, cassava, onion, parsnip, beetroot, banana, peach, nectarine, paw, pineapple, melon, mesquite, watermelon, acorn, hazelnut, chestnut, grape, chickpea, chia, potato, coconut, almond, soybean, sorghum, arrowroot, amaranth, taro, cattails, quinoa, buckwheat, corn, rice, atta, hemp, teff or by-products and/or derivatives thereof such as fruit and vegetable pomaces, skins/peels, seeds or roots.

In some preferred embodiments, the plant material is derived from low starch fruit or vegetables including one or more of kiwifruit, apple, pear, orange, carrot, grape, mango, tomato, avocado, berries, bean, pea, lime, lemon, feijoa, onion, beetroot, banana, peach, nectarine, paw, pineapple, melon, watermelon, coconut, soybean or by-products and/or derivatives thereof such as pomaces, skins/peels, seeds or roots.

Preferably, the plant material contains less than 10% starch, more preferably, less than 5% starch and even more preferably, less than 2% starch.

In some preferred embodiments of the invention the composition includes 5-50% w/w of fungal biomass.

The flour composition of the present invention preferably has a flour whiteness similar to or darker than wheat flour.

According to a further aspect of the invention, there is provided a food composition derived from fungal fermentation of a low starch plant material having less than 20% w/w starch, the food composition having a total metabolizable carbohydrate level less than the total metabolizable carbohydrate level of the plant material prior to fermentation.

More preferably, the total metabolizable carbohydrate level of the food composition is at least 20%-90% less than the total metabolizable carbohydrate level of the plant material prior to fermentation.

Even more preferably, the total metabolizable carbohydrate level of the food composition is at least 40%-85% less than the total metabolizable carbohydrate level of the plant material prior to fermentation.

Preferably, the plant material contains less than 10% starch, more preferably, less than 5% starch and even more preferably, less than 2% starch.

In preferred embodiments of the invention the food composition is a paste, liquid, powder, solid, or in free-flowing form such as flakes, granules, grains or pellets.

According to a further embodiment of the invention there is provided a process for the production of a flour composition derived from fungal fermentation of plant material, the flour composition having a total metabolizable carbohydrate level of between 1-50% by weight, the process including the steps of;
 a) hydrating, drying or maintaining a lignocellulosic plant material substrate to achieve a substrate moisture level between 45%-95%;
 b) sterilising the substrate of a);
 c) inoculating the substrate with an active, edible higher fungus;
 d) incubating the inoculated substrate for a period of time to produce a fermented substrate;
 e) drying the fermented substrate; and
 f) milling the dried, fermented substrate to form a flour composition.

More preferably, the process is for the production of producing a flour composition having a total metabolizable carbohydrate level of 0.1-15% by weight, and even more preferably, 5-10% by weight available carbohydrate.

Preferably, the active fungus used for inoculation in step c) is added at an amount of 5-50% w/w of the hydrated lignocellulosic plant material.

More preferably, the active fungus is added at an amount of 10-20% w/w.

In preferred embodiments of the invention, the process includes the further step of adding a functional additive to the substrate prior to inoculation. More preferably, the functional additive is a food grade nitrogen source. The nitrogen source is preferably selected from ammonium sulphate, glutamic acid, yeast extract, peptone and/or di-ammonium phosphate (DAP).

In further preferred embodiments of the invention the plant material is lignocellulosic plant material selected from one or more fruits, nuts, cereals or vegetables including but not limited to kiwifruit, apple, pear, orange, carrot, grape, mango, tomato, avocado, berries, bean, pea, lime, lemon, feijoa, cassava, onion, parsnip, beetroot, banana, peach, nectarine, paw, pineapple, melon, mesquite, watermelon, acorn, hazelnut, chestnut, chickpea, chia, grape, potato, coconut, almond, soybean, sorghum, arrowroot, amaranth, taro, oats, cattails, quinoa, wheat, barley, buckwheat, corn, rice, atta, spelt, rye, hemp, teff or by-products and/or derivatives thereof such as fruit and vegetable pomaces, skins/peels, seeds or roots.

In some embodiments of the invention the flour composition produced by the process described above is gluten-free and the plant material is lignocellulosic plant material selected from one or more gluten free plant materials including, but not limited to kiwifruit, apple, pear, orange, carrot, grape, mango, tomato, avocado, berries, bean, pea, lime, lemon, feijoa, cassava, onion, parsnip, beetroot, banana, peach, nectarine, paw, pineapple, melon, mesquite, watermelon, acorn, hazelnut, chestnut, grape, chickpea, chia, potato, coconut, almond, soybean, sorghum, arrowroot, amaranth, taro, cattails, quinoa, buckwheat, corn, rice, atta, hemp, teff or by-products and/or derivatives thereof such as fruit and vegetable pomaces, skins/peels, seeds or roots.

In some preferred embodiments, the plant material is derived from low starch fruit or vegetables including one or more of kiwifruit, apple, pear, orange, carrot, grape, mango, tomato, avocado, berries, bean, pea, lime, lemon, feijoa, onion, beetroot, banana, peach, nectarine, paw, pineapple, melon, watermelon, coconut, soybean or by-products and/or derivatives thereof such as pomaces, skins/peels, seeds or roots.

Preferably, the raw plant material contains less than 10% starch, more preferably, less than 5% starch and even more preferably, less than 2% starch.

In preferred embodiments of the invention the lignocellulosic plant material may be in the form of a moist or wet pomace, slurry, pulp or paste. Alternatively, the plant material may be in a dry or semi-dry form, such as a mulch, powder, or coarsely chopped plant material.

In further preferred embodiments, the step of hydrating, drying or maintaining the plant material achieves a substrate with a moisture content of between 75%-90%, more preferably about 77%-83%.

Preferably, the sterilisation step includes one or more of high temperature sterilisation, high pressure sterilisation, low temperature sterilisation, irradiation or chemical sterilisation.

In preferred embodiments of the invention the active edible, higher fungus utilised in the inoculation step are wood-decay fungi, and more preferably, white rot fungi or brown rot fungi.

In one preferred process where white rot fungi is used, the white rot fungi may be selected from the genera *Pleurotus, Lentinula, Ganoderma, Volvariella, Auricularia, Armillaria, Flammulina, Pholiota, Tremella* and/or *Hericium*.

In alternative process where brown rot fungi is utilised, preferred brown rot fungi may be selected from the genera *Agaricus, Laetiporus* and/or *Sparassis*.

Preferably, the incubation step includes incubating the inoculated substrate at 18° C.-40° C. More preferably, the incubation occurs at 25-30° C.

Preferably, the incubation period is 5-50 days. More preferably, the incubation period is 5-28 days.

In some preferred embodiments, the process includes incubating the inoculated substrate at 25° C. for 30 days.

In preferred embodiments of the invention, the flour composition produced by the process comprises 0.1-30% by weight metabolizable carbohydrate. More preferably, the flour composition produced by the process comprises 0.1-15% by weight metabolizable carbohydrate, even more preferably, less than 10% by weight metabolizable carbohydrate.

In further preferred embodiments of the invention the flour composition produced by the process comprises between 30-90% by weight dietary fibre. In the more preferred embodiments, the flour comprises 40-80% by weight dietary fibre.

In more preferred embodiments, the dietary fibre includes 5%-70% beta glucans, even more preferably, fungal derived 1-3 and 1-6 beta glucans.

More preferably, the dietary fibre includes 40%-65% fungal derived 1, 3 and 1,6 beta glucans.

In further preferred embodiments the flour composition produced by the process has 150-300 calories/100 g flour. More preferably, the flour composition includes 150-250 calories/100 g flour.

In even more preferred embodiments, the flour composition produced by the process has less than 200 calories per 100 g flour.

In preferred embodiments of the invention the flour composition produced by the process has a linoleic acid content of 10% of total fat or greater.

In preferred embodiments of the invention the flour composition produced by the process has a linoleic acid content of 20-70% of total fat.

In a preferred embodiment of the invention the step of drying the fermented substrate includes drying the substrate at a temperature of 30°-70° C. More preferably, the drying step occurs under vacuum conditions.

According to a further embodiment of the invention there is provided a process for the production of a composition derived from fungal fermentation of plant material, the composition produced by the process having a total metabolizable carbohydrate level of less than the total metabolizable carbohydrate level of the starting plant material, the process including the steps of;

a) hydrating, drying or maintaining a lignocellulosic plant material substrate to achieve a substrate moisture level between 45%-95%;

b) sterilising the substrate of a);

c) inoculating the sterile substrate with an active, edible, higher fungus; and d) incubating the inoculated substrate for a period of time to produce a fermented substrate.

Preferably, the active fungus used for inoculation in step c) is added at an amount of 5-50% w/w of the hydrated lignocellulosic plant material.

More preferably, the active fungus is added at an amount of 10-20% w/w.

In preferred embodiments of the invention the active, edible fungus utilised in the inoculation step are wood-decay or lignocolous fungi, and more preferably, white rot fungi or brown rot fungi.

In one preferred process where white rot fungi is used, the white rot fungi may be selected from the genera *Pleurotus, Lentinula, Ganoderma, Volvariella, Auricularia, Flammulina, Pholiota, Tremella* and/or *Hericium*.

Preferably, the process includes the further step of drying or partially drying the fermented substrate.

In one embodiment the fermented substrate is partially dried to form a paste.

In a further embodiment, the fermented substrate is dried to form a free-flowing composition. The free-flowing composition may be in the form of granules, powder, flakes, pellets or grains.

In further embodiments the fermented substrate is dried in a solid form or shape such as sheets, cubes, rolls or in specific three dimensional shapes, such as plates, cups, cup holders or packaging for example.

Throughout the specification the terms "metabolizable carbohydrate" and "total carbohydrate" are used. "metabolizable carbohydrate" represents that fraction of carbohydrate that can be digested by human enzymes, is absorbed and enters into intermediary metabolism. It does not include dietary fibre and for the purposes of this specification is calculated as:

Total carbohydrate−dietary fibre=metabolizable carbohydrate

The term "flour" or "flour composition" should be taken to mean any powder-like material produced by any means, and includes, but is not intended to be limited to powders produced solely by using milling techniques. "Flour composition" is intended to demonstrate the composition has one or more qualities similar to that of traditional flours, such as colour, texture, density, moisture levels or possible use for example.

Further aspects of the invention, which should be considered in all its novel aspects, will become apparent to those skilled in the art upon reading of the following description which provides at least one example of a practical application of the invention.

BRIEF DESCRIPTION OF THE DRAWINGS

One or more embodiments of the invention will be described below by way of example only, and without intending to be limiting, with reference to the following drawings, in which.

DETAILED DESCRIPTION OF THE INVENTION

Figure 1:
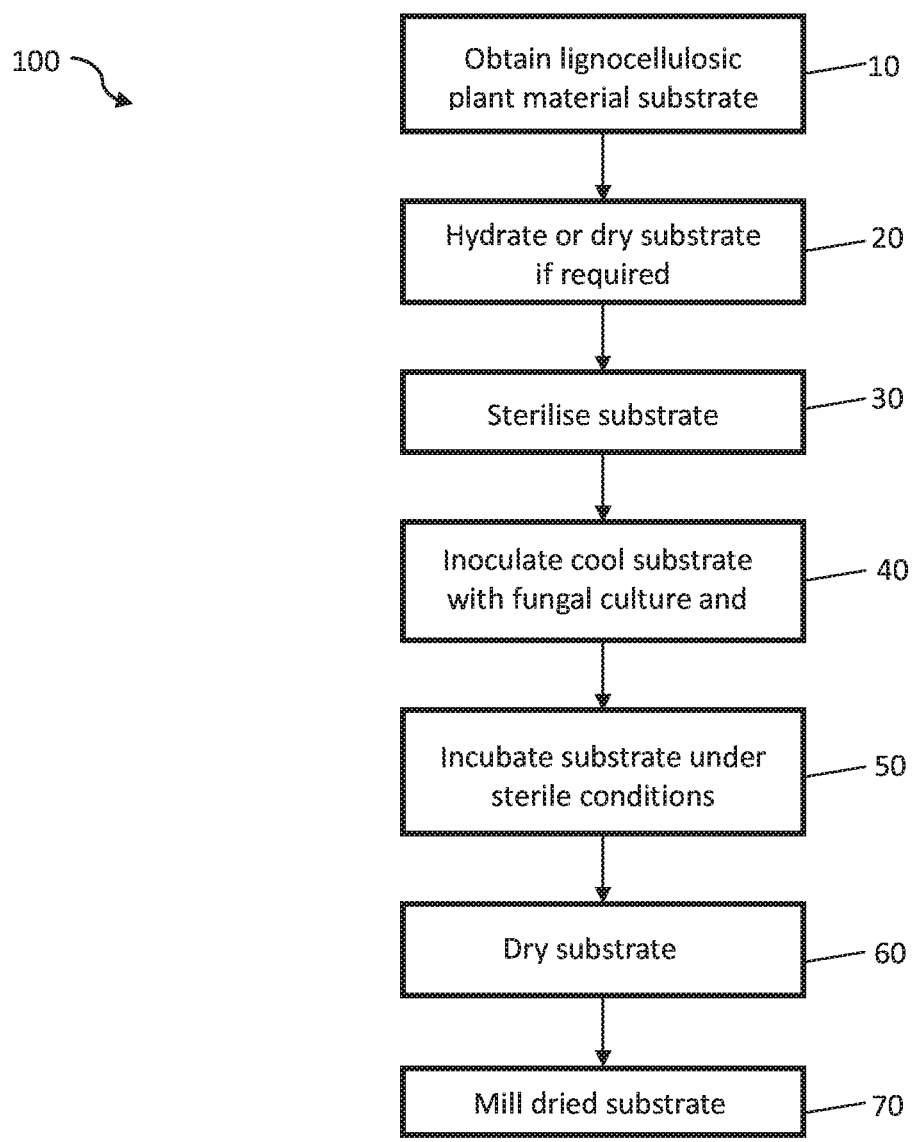
FIG. 1 shows the process for preparing a flour composition in one embodiment of the invention.

The composition and process of the present invention provides a range of low calorie flours and food compositions produced by the fermentation of lignocellulose-rich plant materials using edible higher fungi.

The fermentation of plant materials using fungi works on the principle that the fungi utilise the plant material as a food source to enable growth. When fermentation conditions are optimised to convert metabolizable sugars into protein-rich fungal biomass, the plant material substrate becomes depleted in energy after fermentation, particularly metabolizable carbohydrates. This can result in a substrate having a lower calorific value and higher protein content than prior to the fermentation process.

The fermented flour products produced are low in metabolizable carbohydrates, fat, cholesterol and may be gluten free, while being high in dietary fibre, particularly beta-glucan prebiotic fibre, and protein. These characteristics make them particularly attractive for creating lower calorie baked goods, as well as having other applications as pet food, nutraceutical, cosmetic or pharmaceutical ingredients or for other non-food purposes. The flour compositions described herein impart a range of different flavours, textures and colours to food products depending on the plant material used in the production process, making then a valuable ingredient in a wide range of food products.

The flours and flour blends of the present invention may be derived from a wide variety of fruits, vegetables, nuts and grains. One of the advantages of the present invention is that the preparation process involves the use of a high-water content substrate, as opposed to the dry plant material that is commonly used in the flour milling process. This ability to use a wet substrate increases the range of plant materials that may be used to create a flour composition, for example fresh whole or waste fruit, pomaces, peels or other by products from separate industrial processes such as juicing. The process enables the use of by-products from the agriculture and food production industry to produce a nutritious food product suitable for human consumption.

In the preferred embodiment of the invention the food composition is milled to create a flour. However, the process may also be used without milling to create a fermented food composition in the form of a free-flowing material such as flakes, granules, pellets or grains. Alternatively the fermented food product may be formed into solid 3D shapes or sheets, or only partially dried to create a paste or liquid product.

In one preferred embodiment of the invention where the food composition is a flour composition, the plant material used as a substrate for flour production is apple pomace, typically sourced as a by-product from the juicing industry. Similar pomaces often obtained as juicing by-products that are exemplified below are carrot pomace and orange pomace. These substrates are given as examples only and are not intended to be limiting. It is envisaged that a wide range of fruits, vegetables, cereals and parts thereof may be used in the preparation of a low calorie flour composition. The process described below can be implemented on plant material having a wide variety of textures, sizes and moisture content, from dry cereal grains through to wet waste material formed as a by-product of other fruit or vegetable processing operations.

As described earlier, some of the plant material that may be suitable for the flour compositions of the present invention are fruits, nuts, cereals or vegetables including but not limited to kiwifruit, apple, pear, orange, carrot, grape, mango, tomato, avocado, berries, bean, pea, lime, lemon, feijoa, cassava, onion, parsnip, beetroot, banana, peach, nectarine, paw, pineapple, melon, mesquite, watermelon, acorn, hazelnut, chestnut, chickpea, chia, grape, potato, coconut, almond, soybean, sorghum, arrowroot, amaranth, taro, oats, cattails, quinoa, wheat, barley, buckwheat, corn, rice, atta, spelt, rye, hemp, tell or by-products and/or derivatives thereof such as fruit and vegetable pomaces, skins/peels, seeds or roots.

In preferred embodiments of the invention, the plant material is derived from low starch fruit or vegetables which including one or more of kiwifruit, apple, pear, orange, carrot, grape, mango, tomato, avocado, berries, bean, pea, lime, lemon, feijoa, onion, beetroot, banana, peach, nectarine, paw, pineapple, melon, watermelon, coconut, soybean or by-products and/or derivatives thereof. Low starch product as particularly suited for the production of the compositions of this invention, as when processed according to the disclosed methods, a flour composition having low levels of metabolizable carbohydrate can be achieved.

Preferably, the plant material contains less than 10% starch, more preferably, less than 5% starch and even more preferably, less than 2% starch.

The fermentation step in the process of the present invention involves the use of edible higher fungi to break down the plant material and digest the carbohydrate present within the substrate. When the resulting flour composition is to be used for human consumption edible fungi should be used to ensure the flour composition product is non-toxic and meets appropriate food standards and regulations. In some instances the flour compositions of the present invention may be used for non-food purposes, for example as an adhesive, binder, filler, biofuels, cosmetics or depending on the substrate used, as a biodegradable substitute for polystyrene and other plastics, such as in disposable plates and cutlery, or as packaging inserts. Depending on the situation for which the flour composition is to be used, non-edible fungi or fungi that imparts an unpleasant taste may be utilised if suitable.

Basidiomycota and Ascomycota are two large fungal phyla that constitute the subkingdom Dikarya, which is often referred to as the "higher fungi" within the kingdom Fungi. These include "wood decay" fungi that are characterised by their ability to digest lignocellulosic materials—also known as lignocolous fungi, which includes both brown-rot and white-rot fungi. This ability of lignocolous fungi to grow on the plant material and actively digest lignocellulosic material is allows for the fermentation of plant materials to successfully produce the flour compositions of the present invention.

Lignocellulose is a complex mixture of plant cell wall polymers composed mainly by polysaccharides cellulose and hemicellulose) aromatic lignin polymer. Together with pectin and starch, these are the main components of plant dry matter. White-rot fungi break down the lignin in plant material, leaving the lighter-coloured cellulose behind, giving to the plant material a whitish colour. The use of such white rot fungi in the present invention help to achieve a final flour composition with a whiter, more appealing colour.

Non-limiting examples of edible white rot fungi that may be used with the current process are fungi from the genus *Pleurotus* (e.g. *P. ostreatus, P. eryngi, P. pulmonarius, P. djamor, P. australis, P. purpureo-olivaceus, P. citrinopileatus, P. sajor-caju, P. florida, P. flabellatus, P. ferulae, P. cystidiosus*), *Lentinula* (*L. edodes, L. boryana, L. novae-zelandiae, L. tigrinus*), *Ganoderma* (*G. lucidum, G. applanatum, G. tsugae*), *Volvariella* (*V. volvacca, V. esculenta, V. bakeri, V. dysplasia*), *Auricularia* (*A. auricula, A. cornea, A. subglabra*), *Armillaria* (*A. mellea, A. ostoyae, A. gemina, A. calvescens, A. Sinapin, A. gallica*), *Flammulina* (*F. velutipes, F. fennae*), *Pholiota* (*P. squarrosa, P. nemako*), *Tremella* (*T. mesenterica, T. fuciformis*), *Hericium* (*H. erinaceus, H. coralloides*) among others.

A further type of fungi that may be utilised in the current process are known as brown-rot fungi. Brown rot fungi preferentially break down hemicellulose and cellulose in plant matter. As a result of this type of decay, the plant material shows a brownish discoloration, which may result in a final flour composition having a darker colour than a flour produced using the fermentation of a white rot fungi. Examples of edible brown rot fungi are species belonging to the genus *Agaricus* (*A. campestris, A. bisporus, A. bitorquis*), *Laetiporus* (*L. sulphurous*), *Sparassis* (*S. crispa, S. spathulata*).

Fungal cultures suitable for use in the present invention may be purchased from a wide range of specialist retailers selling mushroom and fungal supplies, for example the website www.fungi.com retails a wide range of different fungal cultures at the time of writing. Alternatively, the fungal cultures may be isolated directly from mushrooms themselves, for example oyster mushrooms may be used to supply inoculant of *Pleurotus pulmonarius*, Portobello or button mushrooms may be used to supply inoculant of *Agaricus* species.

The selection of using brown rot and/or white rot fungi may be influenced by the desired colour of the final product or by the characteristics of the substrate. For example a particularly fibrous substrate may be fermented using a combination of both a white rot and a brown rot fungi in order to aid in the digestion of the high levels of lignin, cellulose and hemicellulose.

The use of higher fungi, such as the brown and white rot fungi, in the process of the present invention is indicated by the presence of linear (1,3)-beta-glucans with (1,6)-linked-beta-glucosyl or beta-(1,6)-oligoglucosyl side chains in the final fermented product. The use of other fungi for the fermentation process, such as yeast and imperfect fungi, would result in the final composition having the presence of branch-on-branch (1,3; 1,6)-beta-glucans, for example. These differences enable the type of fungi used in the process to be determined by analysis of the final flour product.

Figure 2:
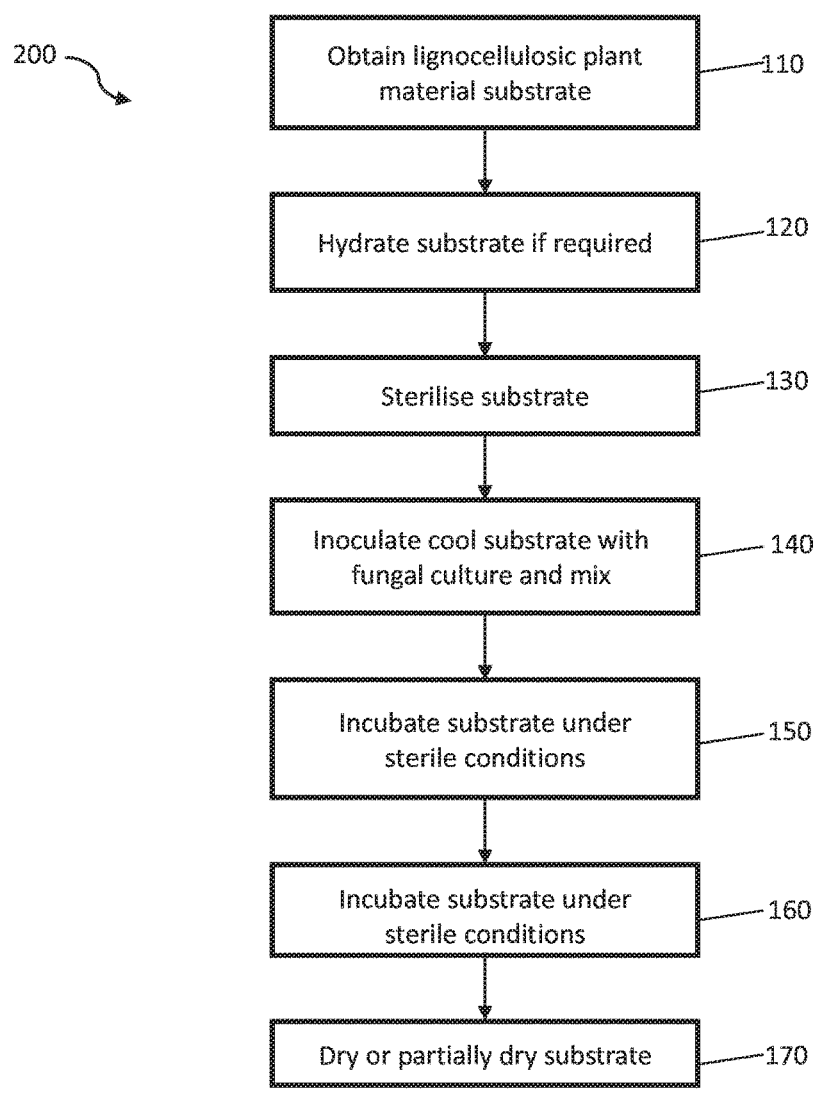
FIG. 2 shows a process for preparing a food composition in an alternative embodiment of the invention.

A diagrammatic representation of the process used to produce the food compositions of the present invention is shown in FIG. 1 by process 100 and FIG. 2 by process 200. The process of FIG. 1 shows the steps required to make a flour composition, while FIG. 2 outlines the process for making a food composition that may take a variety of different structural forms.

In a first step 10 of the process 100, raw lignocellulosic plant material is obtained. The selection of the type of plant material to be used will be dependent on the end product use. For the production of a low-calorie gluten free flour to be used in baking or as an additive in commercial food production, a gluten-free plant material, such as a fruit or vegetable derived plant material would be used.

In order to prepare the substrate for fermentation, the substrate is prepared such that is has a moisture content of between approximately 55% and 90%. This preparation step may include the hydration of the substrate by the addition of water if the plant material has a lower moisture content than required, or in some circumstances drying, pressing or decanting may be required if a particularly wet substrate is used. For substrates that are obtained already having a moisture level within the required ranges, such as a fruit pomace, no further hydration or drying is required.

For particularly dry substrate the hydration process may include adding additional amounts of water to the substrate over a period of time to ensure the water has been fully absorbed within the plant material before progressing to the next step in the process.

Once the substrate has been prepared, the substrate is sterilised 30. This step may occur using standard heat and high pressure sterilisation to kill microbes, or other sterilisation methods such as irradiation, low temperature sterilisation or chemical sterilisation if appropriate to the end product use.

During the substrate preparation steps, functional additives may optionally be added to the substrate to fortify the product or to increase particular levels of certain substances within the substrate. In one example it may be beneficial to decrease the carbon/nitrogen ratio of the substrate through supplementation with inorganic or organic food grade nitrogen sources. Examples of such sources include, but are not limited to ammonium sulphate, glutamic acid, yeast extract, peptone, di-ammonium phosphate (DAP).

Following sterilisation the substrate is cooled to room temperature and inoculated with fungal culture 40. The fermentation process relies on the use of active fungal biomass as inoculant to be used to colonise the sterile plant material substrate. Preferably, approximately 5%-50% (w/w wet substrate) of actively growing fungal culture is used to effectively inoculate the entire substrate. Once the fungal culture has been added to the substrate, it is mixed through the substrate, preferably uniformly and the substrate is then ready for incubation 50.

The use of fungal substrate in an amount of 5-50% w/w of the plant material is preferable, with more preferred amounts of fungal substrate added being in the range of 10-20% w/w. The final amount of fungal substrate used will depend on the type of lignocellulosic plant material being used, however levels above at least 5% w/w fungal substrate has been shown to result in the composition of the present invention with lower levels of metabolizable carbohydrate within a shorter period of time to known fermentation techniques.

Incubation 50 of the inoculated substrate under sterile conditions takes place over a period of anywhere from 5-50 days, but preferably between 5-28 days. Complete colonisation is judged using visual analysis, although it is expected that different type of fungi and substrate combinations may increase or decrease the incubation period. The ability of the process of the present invention to achieve the low carbohydrate composition of the present invention using less than four weeks of fermentation time results in a number of efficiencies economically, including reduced storage time, reducing processing costs and allowing for greater production capacity when compared with extended fermentation cycles.

Temperature and humidity conditions during incubation are very important. Optimum temperatures for fungal growth are between 18° C.-30° C., with temperatures above 30° C. slowing fungal growth and temperatures above 40° C. resulting in very little fungal growth. Maintaining temperatures at 25-30° C. is particularly preferable to produce the flour compositions of the present invention, within an economically beneficial timeframe.

Specific optimum temperatures exist for different fungi species and these should be taken into consideration when the incubation conditions are set up. Humidity in the incubation space should be kept to a maximum to facilitate fungal growth, preferably between 90-100% humidity.

Air flow around the substrate during incubation should also be managed to prevent build-up of either excessive oxygen or carbon dioxide. CO2 levels are preferably held between 5 and 30% for the *Pleurotus* fungi, however this may change depending on the fungi used in the fermentation process.

During growth, the fungus consume free sugars and degrade plant polymers in the substrate, converting them into a biomass rich in proteins, fungal polysaccharides (chitin and $\beta$-1,3 and $\beta$-1,6-glucans), and fungal-derived vitamins. This consumption of sugars results in the low calorie/low metabolizable carbohydrate flour composition formed in the final stages of the process.

Following incubation, the fermented substrate is removed from incubation and dried 60 using a low temperature drying process. The drying process may be undertaken using commonly known drying apparatus, such as food desiccation apparatus, air drying, drum drying or oven drying.

Preferably, the drying temperature is kept below 40° C. as the lower temperature drying has been found to achieve an end product with a lighter colour, making it more preferable for some baked products. When the end product is to have a use where the final product colour is less important, the drying temperature may be increased to speed up the drying process. The maximum drying temperature should be around 75° C., as at temperatures higher than this the nutritional value of the composition can be compromised by the breakdown of antioxidants, vitamins or proteins for example.

The drying of the fermented substrate may occur under vacuum conditions. This may result in a product having a lighter or whiter final colour and milder flavour compared to not drying under vacuum, possibly due to the decreased oxidation of the composition during the drying process and reduction of aroma compounds through vacuum.

The colonised substrate is dried until it becomes millable, usually when the moisture content is less than or close to 14%. At moisture levels above 14%, microorganisms can begin to flourish, affecting the taste, aroma and shelf life of the product.

Subsequently the dry substrate is milled 70 into a fine flour, using standard milling techniques. The dry substrate is composed of plant material components not metabolised by the fungus such as plant fibre, plant vitamins and minerals, combined with the dried fungal biomass.

The final dried, milled product produced as a result of this process is a lower calorie, low metabolizable carbohydrate flour when compared to flour produced using standard flour processing techniques. Three examples provided below show the process and final product produced using apple, carrot and orange pomaces.

FIG. 2 shows process 200. The process 200 is essentially the same as the process 100 described above for FIG. 1, however drying step 60 and milling step 70 have been omitted. Instead, in process 200 following incubation step 160, the process is dried or partially dried 170. The drying may result in a food composition having a range of different textures, sizes and shapes depending on how the drying takes place, and the extent to which drying occurs.

The drying step 170 may include the use of know techniques for the drying or partial drying of a wet substrate to form various shapes and textures. For example, the substrate may be dried in thin layers to produce a flaked product, compacted and dried simultaneously to produce a solid form, dried and densified to produce pellets, or partially dried and blended to produce a paste.

EXAMPLE 1

Apple Flour

Wet apple pomace (80% w/w moisture) was mixed with a 1% (w/w) food grade yeast extract in 1-3 kg batches. The mixture was heat-sterilised at a pressure of 100 kPa (15 psi), and 121° C. for 20 minutes.

The substrate was cooled to room temperature then 10% (w/w) of fungal inoculant consisting of actively growing culture of *Pleurotus pulmonarius* was aseptically added.

The substrate and inoculant were mixed uniformly and the inoculated substrate incubated under sterile conditions for 30 days at 25° C., allowing air exchange between the culture and environment, but retaining maximum humidity.

After incubation, the fermented substrate was removed from the incubators and the contents dried using a food desiccator at 35° C., to achieve a moisture content below 14%.

The dry fermented material was then passed through an appropriate mill to produce a fine flour.

The composition of the final product is given below showing the composition of individual macro and micronutrients per 100 g.

| Compositional Analysis of Exemplary Fermented Apple Flour Per 100 grams | |
|---|---|
| Moisture at 105° C. | 6.9 g |
| Energy | 960 KJ (229.4 cal) |
| Protein[§] | 20 g |
| Fat | 4.1 g |
| Saturated fat | 0.6 g |
| Linoleic acid | 1.5 g |
| Oleic acid | 0.6 g |
| Cholesterol | <12 mg |
| Carbohydrate (corrected by TDF) | 8.0 g |
| Soluble sugars | 2.7 g |
| Total dietary fibre (TDF) | 58.4 g |
| $\beta$-1,3 and $\beta$-1,6 glucan fibre | 24.8 g |
| Ash | 2.0 g |
| Sodium | 140.0 mg |
| Potassium | 628.1 mg |
| Calcium | 230.0 mg |
| Phosphorus | 118.8 mg |
| Magnesium | 72.2 mg |
| Iron | 5.5 mg |
| Zinc | 2.0 mg |
| Selenium | 5.0 mcg |
| Vitamin A (as retinol) | <0.50 mg |
| Vitamin D | <0.20 mg |
| Vitamin E | 0.52 mg |

The process exemplified in Example 1 for the production of apple flour was replicated using *Lentinula* edodes, an alternative species of white-rot fungi. The results comparing the final flour compositions produced using the different fungi are shown below:

| Chemical composition of apple flour fermented by two different white-rot fungi | | |
|---|---|---|
| Per 100 g | *Pleurotus pulmonarius* | *Lentinula edodes* |
| Protein (g) | 20.0 | 24.0 |
| Carbohydrate (corrected by TDF) | 8 | 5.3 |
| Soluble sugars (g) | 2.7 | 0.3 |
| Dietary fibre (g) | 58.4 | 55.6 |
| Fat (g) | 4.1 | 5.3 |

EXAMPLE 2

Carrot Flour 1-3 kg batches of carrot pomace were heat-sterilised at a pressure of 100 kPa (15 psi), and 121° C. for 20 minutes.

The substrate was cooled to room temperature then 10% (w/w) of fungal inoculant consisting of actively growing culture of *Pleurotus pulmonarius* was aseptically added.

The substrate and inoculant were mixed uniformly and the inoculated substrate incubated under sterile conditions for 30 days at 25° C., allowing air exchange between the culture and environment, but retaining maximum humidity.

After incubation, the fermented substrate is removed from the incubators and the contents dried using a food desiccator at 35° C., to achieve a moisture content below 14%.

The dry fermented material was then passed through an appropriate mill to produce a fine flour.

| Compositional Analysis of Exemplary Fermented Carrot Flour Per 100 grams | |
|---|---|
| Moisture at 105° C. | 7.0 g |
| Energy | 831 KJ (198.6 cal) |
| Protein§ | 17 g |
| Fat | 0.2 g |
| Saturated fat | <0.1 g |
| Linoleic acid | 0.14 g |
| Oleic acid | 0.02 g |
| Cholesterol | <12 mg |
| Carbohydrate (corrected by TDF) | 7.9 g |
| Soluble sugars | 1.7 g |
| Total dietary fibre (TDF) | 63.2 |
| β-1,3 and β-1,6 glucan fibre | 39.5 g |
| Ash | 3.8 g |
| Sodium | 300 mg |
| Potassium | 2253.5 mg |
| Calcium | 829.5 mg |
| Phosphorus | 258.6 mg |
| Magnesium | 141.8 mg |
| Iron | 14.5 mg |
| Zinc | 2.4 mg |
| Selenium | 5.2 mcg |
| Vitamin A (as retinol) | <0.5 mg |
| Vitamin D | <0.2 mg |
| Vitamin E | <0.5 mg |

The process exemplified in Example 2 for the production of carrot flour was replicated using *Lentinula edodes*, an alternative species of white-rot fungi. The results comparing the final flour compositions produced using the different fungi are shown below:

| Chemical composition of carrot flour fermented by two different white-rot fungi | | |
|---|---|---|
| Per 100 g | *Pleurotus pulmonarius* | *Lentinula edodes* |
| Protein (g) | 20.0 | 17.6 |
| Carbohydrate (corrected by TDF) | 13.0 | 10.9 |
| Soluble sugars (g) | 3.3 | 1.2 |
| Dietary fibre (g) | 55.0 | 57.8 |
| Fat (g) | 0.9 | 1.1 |

EXAMPLE 3

Orange Flour 1-3 Kg batches of wet orange pomace were heat-sterilised at a pressure of 100 kPa (15 psi), and 121° C. for 20 minutes. The substrate was cooled to room temperature then 10% (w/w) of fungal inoculant consisting of actively growing culture of *Pleurotus pulmonarius* was aseptically added.

The substrate and inoculant were mixed uniformly and the inoculated substrate incubated under sterile conditions for 30 days at 25° C., allowing air exchange between the culture and environment, but retaining maximum humidity.

After incubation, the fermented substrate is removed from the incubators and the contents dried using a food desiccator at 35° C., to achieve a moisture content below 14%.

The dry fermented material was then passed through an appropriate mill to produce a fine flour.

| Compositional Analysis of Exemplary Fermented Orange Flour Per 100 grams | |
|---|---|
| Moisture at 105° C. | 7.5 g |
| Energy | 896 KJ (214.1 cal) |
| Protein§ | 20 g |
| Fat | 0.9 g |
| Saturated fat | 0.3 g |
| Linoleic acid | 0.5 g |
| Oleic acid | 0.15 g |
| Cholesterol | <12 mg |
| Carbohydrate (corrected by TDF) | 12.9 g |
| Soluble sugars | 3.3 g |
| Total dietary fibre (TDF) | 55.0 g |
| β-1,3 and β-1,6 glucan fibre | 22.9 g |
| Ash | 4.3 |
| Sodium | 290.0 mg |
| Potassium | 1060.4 mg |
| Calcium | 1106.5 mg |
| Phosphorus | 122.9 mg |
| Magnesium | 106.1 mg |
| Iron | 2.5 mg |
| Zinc | 2.2 mg |
| Selenium | 6.0 mcg |
| Vitamin A (as retinol) | <0.50 mg |
| Vitamin D | <0.20 mg |
| Vitamin E | <0.50 mg |

The process exemplified in Example 3 for the production of orange flour was replicated using *Lentinula edodes*, an alternative species of white-rot fungi. The results comparing the final flour compositions produced using the different fungi are shown below:

| Chemical composition of orange flour fermented by two different white-rot fungi | | |
|---|---|---|
| Per 100 g | Pleurotus pulmonarius | Lentinula edodes |
| Protein (g) | 17.0 | 13.1 |
| Carbohydrate (corrected by TDF) | 7.9 | 9 |
| Soluble sugars (g) | 1.7 | 0.8 |
| Dietary fibre (g) | 63.2 | 67.1 |
| Fat (g) | 0.2 | 0.3 |

Tables 1 and 2 below shows a nutrient comparison of substrates before and after fermentation, and provides results for the fermentation of additional plant material, grape, beetroot and kiwifruit.

TABLE 1

| | Apple by-product fermentation | | Orange by-product fermentation | | Carrot by-product fermentation | |
|---|---|---|---|---|---|---|
| | before | after | before | after | before | after |
| Energy (cal) | 335 | 229 | 346 | 214 | 354 | 199 |
| Protein (%) | 4 | 20 | 4 | 20 | 6 | 17 |
| Carbs (%) | 44 | 3 | 33 | 3 | 11 | 2 |
| Dietary fiber (%) | 29 | 58 | 23 | 55 | 32 | 63 |
| Total fat (%) | 4 | 4 | 2 | 1 | 1 | 0 |
| Beta-glucans (%) | 0 | 25 | 0 | 23 | 0 | 40 |
| Calcium (mg) | 90 | 230 | 475 | 1106 | 485 | 830 |
| Potassium (mg) | 419 | 628 | 645 | 1060 | 1390 | 2254 |
| Iron (mg) | 3.7 | 5.5 | 1.7 | 2.5 | 3.9 | 14.5 |
| Zinc (mg) | 1.1 | 2 | 1.3 | 2 | 1.6 | 2.4 |

TABLE 2

| | Grape by-product fermentation | | Beetroot by-product fermentation | | Kiwifruit by-product fermentation | |
|---|---|---|---|---|---|---|
| | before | after | before | after | before | after |
| Energy (cal) | 224 | 178 | 323 | 158 | 138 | 118 |
| Protein (%) | 3 | 23 | 11 | 20 | 8 | 15 |
| Carbs (%) | 29 | 1 | 42 | 2 | 17 | 2 |
| Dietary fiber (%) | 46 | 63 | 17 | 65 | 67 | 69 |
| Total fat (%) | 8 | 8 | 1 | 3 | 4 | 2 |
| Beta-glucans (%) | 0 | * | 0 | * | 0 | * |
| Calcium (mg) | 411 | 620 | 133 | 349 | * | 360 |
| Potassium (mg) | 1200 | 12270 | 2697 | 3100 | * | 1680 |
| Iron mg | 7.9 | 11.9 | 6.6 | 9.8 | * | 2.7 |
| Zinc (mg) | 1.3 | 1.9 | 2.9 | 6 | * | 1.9 |

As shown by the tables above, the fermentation process significantly reduces the amount of metabolizable carbohydrate present in the final flour composition when compared to the original fruit/vegetable pomace. The total simple sugar level in each of the flour compositions has reduced significantly following the fermentation process, with the total metabolizable carbohydrate of the final fermented product being 18% of the apple pomace (or a 82% reduction in total carbohydrate).

Similar reductions can be seen in the carrot flour, which shows a 41% reduction in metabolizable carbohydrate in the final product compared to the pomace and orange flour, which shows a 61% reduction in total metabolizable carbohydrate compared with the raw orange pomace. Similar reductions in metabolizable carbohydrate are shown to be achieved with grape, beetroot and kiwifruit pomace.

The reduction in metabolizable carbohydrate level between the starting plant material and the final product may vary between plant materials, however it is expected that most plant materials will have a 20%-90% reduction, with the majority being reduced between 40%-85% compared to the original starting material.

Each of the fermented flours are also shown to have increased in protein when compared to the raw pomace as a result of the fungal fermentation and maintained low levels of fat and very low levels of cholesterol.

Table 3 below shows the fermented flour examples compared to a selection of flours and fibres produced by standard non-fermentation techniques.

TABLE 3

Fermented Flour v Standard Flour Comparison

| Serving size: 100 g | | Calories (cal) | Fat (g) | Carbs (g) | Dietary fiber (g) | Protein (g) |
|---|---|---|---|---|---|---|
| Green Spot's Fermented Flours | Apple flour | 229 | 4 | 8 | 58 | 20 |
| | Orange flour | 214 | 1 | 13 | 55 | 20 |
| | Carrot flour | 199 | 0 | 8 | 63 | 17 |
| Traditional Flours | Wheat flour | 364 | 1 | 73 | 3 | 10 |
| | Oat flour | 404 | 9 | 60 | 6 | 15 |
| | Rice flour | 366 | 1 | 80 | 2 | 6 |
| Alternative Flours | Pea flour | 306 | 2 | 48 | 18 | 22 |
| | Garbanzo flour | 387 | 7 | 47 | 11 | 22 |
| | Montina flour | 380 | 3 | 53 | 17 | 17 |

TABLE 3-continued

Fermented Flour v Standard Flour Comparison

| Serving size: 100 g | | Calories (cal) | Fat (g) | Carbs (g) | Dietary fiber (g) | Protein (g) |
|---|---|---|---|---|---|---|
| Functional (Specialty) Flours | Quinoa flour | 396 | 5 | 58 | 7 | 14 |
| | Chia flour | 517 | 33 | 8 | 37 | 17 |
| | Almond flour | 144 | 12 | 2 | 2 | 6 |

Comparing the flour compositions of the present invention with traditional, alternative and functional flours a significantly reduced level of metabolizable carbohydrate can be clearly seen in each of the fermented flours. In addition, the fermented flours show similar or greater protein levels than all traditional flours and functional flours. Flours with higher protein content as pea and garbanzo flour, but they also show significantly higher levels of carbohydrate than the fermented flours. Comparison of the overall calorific content of each of the products per 100 g shows the fermented flours having a lower energy loading than all of the flours with the exception of almond flour, making them an excellent option to produce low calorie food products.

The combination of the above characteristics results in product that is low in metabolizable sugars, low in fat, while high in protein and fibre, produced by a natural process. In preferred embodiments described within, the flour compositions include 0.1-15% metabolizable carbohydrate, 15-35% protein, 1-10% fat and 50-80% dietary fibre. The inclusion of this range of qualities within a single flour product is a significant advantage commercially and nutritionally.

The fermented flour can be made gluten-free by selecting a gluten-free substrate and unlike other flours it presents very low levels of metabolizable sugars such as mono- and disaccharides and starch; and fat, which makes it a love energy food ingredient.

The colour of the fermented flour vary from alabaster-pearl white to a dark brown shade depending on the starting plant material and fungal species, which also influence the flour odour and taste.

The fermented flours have much potential for the use in the naturally healthy packaged food industry. In particular but not limited to snack or breakfast bars, which can be enriched with the protein, vitamins and dietary fibres of this inventive low calorie flours. Alternatively, the fermented flours can be incorporated into food during the baking and cooking process as a naturally nutritious flour or thickening agent, or it can replace completely or partially traditional flours (e.g. wheat, rye, rice, oat, etc.) in baking, pastries, and pastas; making these products suitable for the dieting, vegan and gluten-free markets as a low carb flour substitute.

Some examples of potential downstream applications for the use of the flour compositions of the present invention are provided below:

| Fermented Orange Flour gluten-free biscuit | |
|---|---|
| Ingredients: | Grams |
| Corn flour | 220 |
| Fermented orange flour | 20 |
| Margarine | 140 |
| White or brown sugar | 50 |
| Desiccated coconut | 30 |

Instructions
Combine all dry ingredients.
Make a well in the centre of the dry ingredients and add margarine.
Mix on medium-low speed until well combined.
Make small balls and press it with a fork.
Bake the biscuits for 25 to 30 min at
300 F

| Fermented Apple Gluten-free Snack Bar | |
|---|---|
| Ingredients: | Grams |
| GF rolled oat | 70 |
| Fermented apple flour | 70 |

| Fermented Apple Gluten-free Snack Bar (continued) | |
|---|---|
| Ingredients: | Grams |
| Almond butter | 90 |
| Chia seeds | 20 |
| Flax meal | 15 |
| Medjool dates pitted | 15 |
| Water | 125 |

Instructions
Combine all dry ingredients. Mix until well combined.
Add almond butter and the water.
spread evenly in a sheet pan and store in the fridge for 30 min. Cut in squares to serve.

| Fermented Carrot Flour Pasta Dough | |
|---|---|
| Ingredients: | Grams |
| Semolina flour | 110 |
| Whole wheat flour | 55 |
| Bread flour | 55 |
| Fermented carrot flour | 16 |
| Salt | 1 |
| Whole egg | One |
| Egg yolks | Five |
| Milk | 22 ml |

Instructions
Combine all dry ingredients.
Make a well in the centre of the dry ingredients; add eggs, yolks and milk.
Mix on medium-low speed until well combined.
Once the dough is mixed, turn out onto a sheet of plastic wrap. Form dough into a ball, wrap tightly and let rest in the refrigerator for two (2) hours.
Once dough is chilled, divide in to four (4) even pieces. Depending on the type of pasta you want to make, use either a pasta roller or a rolling pin to create even sheets. Hand cut or continues using your pasta roller to achieve desired shape.
Pasta can either be used immediately or air-dried for future use.

| Fermented Apple and Carrot Flours Barbeque Sauce | |
|---|---|
| Ingredients: | Grams |
| Tomato sauce | 425 |
| Fermented apple flour | 30 |
| Fermented carrot flour | 30 |
| Apple cider vinegar | 118 ml |
| Honey | 170 |
| Tomato paste | 56 |
| Molasses | 85 |
| Worcestershire | 51 |
| Mesquite liquid smoke | 9 ml |
| Smoke paprika | 1 |
| Clove garlic | one |
| Black pepper | 1 |
| Onion powder | 1 |
| Salt | 1 |

Instructions
In a blender, blend together all ingredients on low for 30 seconds until smooth.

In a medium saucepan, bring sauce to a simmer over medium heat. If the sauce appears too thick, add water until you reach your desired consistency.

Use the sauce immediately, or refrigerate in a sealed container for up to 1 week.

| Fermented Apple Flour Russian Black Bread | |
|---|---|
| Ingredients: | Grams |
| Lukewarm water | 255 |
| Apple cider vinegar | 28 |
| Fermented apple flour | 169 |
| Salt | 7 |
| Unsalted butter | 28 |
| Brown sugar | 14 |
| Fennel seeds | 3 to 7 |
| Instant yeast | 7.5 |
| Unbleached Bread Flour | 298 |

Instructions

Place all of the ingredients in a large bowl, reserving 1 cup of the bread flour. Mix until sticky dough begins to form.

Mix in the remaining flour and knead for 7 minutes, or until the dough becomes soft and elastic, but may still be somewhat sticky to the touch. Cover the bowl and let the dough rise until doubled, 45 minutes to 1 hour.

After the first rise, shape the dough into an oblong loaf. Place in a greased 9"×5" or 10"×5" bread pan, cover with greased plastic, and let rise until almost doubled, about 60 to 90 minutes.

While the dough is rising, preheat the oven to 375° F. When the dough has almost doubled, brush or spray the top with water, dust with pumpernickel or fermented apple, and score (slash) the top.

Bake the bread for about 35 minutes, until it sounds hollow when you thump the bottom, or the inside measures 205° F. on a digital thermometer. Remove the loaf from the oven and cool it on a rack before slicing.

Store bread well wrapped at room temperature for several days. Freeze for longer storage.

The fermented flours may also be formulated into naturally healthy food and beverage supplements, nutraceuticals and/or nutritional or pharmaceutical supplements.

The fermented flours of the present invention may have further application outside of the food industry, as an ingredient in adhesive, industrial filler and binders, cosmetics, or used to create biodegradable packing, for example disposable cups, plates, cutlery or packing fillers and inserts.

The entire disclosures of all applications, patents and publications cited above and below, if any, are herein incorporated by reference.

Reference to any prior art in this specification is not, and should not be taken as, an acknowledgement or any form of suggestion that that prior art forms part of the common general knowledge in the field of endeavour in any country in the world.

Where in the foregoing description reference has been made to integers or components having known equivalents thereof, those integers are herein incorporated as if individually set forth.

It should be noted that various changes and modifications to the presently preferred embodiments described herein will be apparent to those skilled in the art. Such changes and modifications may be made without departing from the spirit and scope of the invention and without diminishing its attendant advantages. It is therefore intended that such changes and modifications be included within the present invention.

What is claimed is:

1. A process for production of a flour composition derived from fungal fermentation of plant material to reduce a level of metabolizable carbohydrate in the flour composition, the process including the steps of:
   a) providing a lignocellulosic plant material substrate having a moisture level between 55% and 90%, wherein the lignocellulosic plant material substrate is fruit pomace, vegetable pomace, fruit skins/peels, or vegetable skins/peels;
   b) sterilizing the lignocellulosic plant material substrate;
   c) inoculating the sterile substrate with an active, edible higher fungus to break down the plant material and digest the carbohydrate present within the lignocellulosic plant material substrate, at an amount of 5-50% w/w of the lignocellulosic plant material substrate, said edible higher fungus is a white rot fungi selected from the group consisting of *Pleurotus eryngii, Pleurotus pulmonarius, Pleurotus djamor, Pleurotus australis, Pleurotus purpureo-olivaceus, Pleurotus citrinopileatus, Pleurotus florida, Pleurotus flabellatus, Pleurotus ferulae*, and *Pleurotus cystidiosus;*
   d) incubating the inoculated substrate at between 18° C. and 40° C. for a period of between 5 and 28 days and under air flow to prevent build-up of either excessive oxygen or carbon dioxide to produce a fermented substrate;
   e) drying the fermented substrate; and
   f) milling the dried, fermented substrate to form the flour composition,
   wherein a reduction in the level of the metabolizable carbohydrate between the plant material substrate and the flour composition is between 20% and 90%,
   wherein the process further comprises adding a functional additive comprising a food grade nitrogen source to the lignocellulosic plant material substrate prior to inoculation,
   wherein the flour composition produced by the process has a total metabolizable carbohydrate level of 0.1-30% by weight,
   wherein the flour composition comprises 30-90% by weight dietary fiber, and
   wherein the dietary fiber comprises 5-70% fungal derived 1,3 and 1,6 beta glucans.

2. The process of claim 1, wherein the flour composition produced by the process has a total metabolizable carbohydrate level of 0.1-15% by weight.

3. The process of claim 1, wherein the active, edible higher fungus is added an amount of 10-20% w/w of the lignocellulosic plant material substrate.

4. The process of claim 1, wherein the fruit pomace, vegetable pomace, fruit skins/peels, or vegetable skins/peels is from apple, orange, or carrot.

5. The process of claim 1, wherein the fruit pomace, vegetable pomace, fruit skins/peels, or vegetable skins/peels is from kiwifruit, apple, pear, orange, carrot, grape, mango, tomato, avocado, berries, lime, lemon, onion, beetroot, banana, peach, nectarine, paw, pineapple, melon, watermelon, or coconut.

6. The process of claim 1, wherein the flour composition produced by the process has less than 300 calories/100 g flour.

7. The process of claim 1, wherein the inoculated substrate is incubated in an incubation space with humidity being between 90-100%.

8. The process of claim 1, wherein the food grade nitrogen source is selected from the group consisting of ammonium sulphate, glutamic acid, yeast extract, peptone, di-ammonium phosphate (DAP), and a combination thereof.

9. The process of claim 1, wherein the step of sterilizing the lignocellulosic plant material substrate includes one or more of: irradiation and chemical sterilization.

10. The process of claim 1, wherein the step of drying the fermented substrate includes drying the fermented substrate at a temperature of 30°-70° C.

11. The process of claim 1, wherein the step of drying the fermented substrate includes drying the fermented substrate at a temperature of 30°-70° C. and occurs under vacuum conditions.

12. The process of claim 1, wherein the step of drying the fermented substrate comprises using a low temperature drying process at a temperature below 40° C.

13. The process of claim 1, wherein the step of drying the fermented substrate comprises using a low temperature drying process at a temperature below 40° C. and occurs under vacuum conditions.

14. The process of claim 1, wherein the lignocellulosic plant material substrate is provided with a moisture level of between 75% and 90%.

15. A process for production of a flour composition derived from fungal fermentation of plant material to reduce a level of metabolizable carbohydrate in the flour composition, the process including the steps of:
  a) providing a lignocellulosic plant material substrate having a moisture level between 55% and 90%, wherein the lignocellulosic plant material substrate is fruit pomace, vegetable pomace, fruit skins/peels, or vegetable skins/peels;
  b) sterilizing the lignocellulosic plant material substrate;
  c) inoculating the sterile substrate with an active, edible higher fungus to break down the plant material and digest the carbohydrate present within the lignocellulosic plant material substrate, said edible higher fungus is a white rot fungi selected from the group consisting of *Pleurotus eryngii, Pleurotus pulmonarius, Pleurotus djamor, Pleurotus australis, Pleurotus purpureo-olivaceus, Pleurotus citrinopileatus, Pleurotus florida, Pleurotus flabellatus, Pleurotus ferulae*, and *Pleurotus cystidiosus*;
  d) incubating the inoculated substrate at between 18° C. and 40° C. for a period of between 5 and 28 days and under air flow to prevent build-up of either excessive oxygen or carbon dioxide to produce a fermented substrate;
  e) drying the fermented substrate; and
  f) milling the dried, fermented substrate to form the flour composition,
  wherein a reduction in the level of the metabolizable carbohydrate between the plant material substrate and the flour composition is between 20% and 90%,
  wherein the process further comprises adding a functional additive comprising a food grade nitrogen source to the lignocellulosic plant material substrate prior to inoculation,
  wherein the flour composition produced by the process has a total metabolizable carbohydrate level of 0.1-30% by weight,
  wherein the flour composition comprises 30-90% by weight dietary fiber, and
  wherein the dietary fiber comprises 5-70% fungal derived 1,3 and 1,6 beta glucans.

16. A process for production of a flour composition derived from fungal fermentation of plant material to reduce a level of metabolizable carbohydrate in the flour composition, the process including the steps of:
  a) providing a lignocellulosic plant material substrate having a moisture level between 55% and 90%, wherein the lignocellulosic plant material substrate is fruit pomace, vegetable pomace, fruit skins/peels, or vegetable skins/peels;
  b) sterilizing the lignocellulosic plant material substrate;
  c) inoculating the sterile substrate with an active, edible higher fungus to break down the plant material and digest the carbohydrate present within the lignocellulosic plant material substrate, said edible higher fungus is a white rot fungi selected from the genus of *Pleurotus*, wherein the white rot fungi is not *Pleurotus ostreatus* or *Pleurotus sajor-caju*;
  d) incubating the inoculated substrate at between 18° C. and 40° C. for a period of between 5 and 28 days and under air flow to prevent build-up of either excessive oxygen or carbon dioxide to produce a fermented substrate;
  e) drying the fermented substrate; and
  f) milling the dried, fermented substrate to form the flour composition,
  wherein a reduction in the level of the metabolizable carbohydrate between the plant material substrate and the flour composition is between 20% and 90%,
  wherein the process further comprises adding a functional additive comprising a food grade nitrogen source to the lignocellulosic plant material substrate prior to inoculation, wherein the flour composition produced by the process has a total metabolizable carbohydrate level of 0.1-30% by weight,
  wherein the flour composition comprises 30-90% by weight dietary fiber, and
  wherein the dietary fiber comprises 5-70% fungal derived 1,3 and 1,6 beta glucans.

* * * * *